(12) United States Patent
Kahn

(10) Patent No.: US 11,973,995 B2
(45) Date of Patent: Apr. 30, 2024

(54) SYSTEM AND METHOD FOR THE UTILIZATION OF A LOW-LATENCY VIDEO SOURCE

(71) Applicant: ARRIS ENTERPRISES LLC, Suwanee, GA (US)

(72) Inventor: Michael Robert Kahn, Cherry Hill, NJ (US)

(73) Assignee: ARRIS Enterprises LLC, Horsham, PA (US)

( * ) Notice: Subject to any disclaimer, the term of this patent is extended or adjusted under 35 U.S.C. 154(b) by 93 days.

(21) Appl. No.: 17/502,273

(22) Filed: Oct. 15, 2021

(65) Prior Publication Data

US 2022/0141509 A1     May 5, 2022

Related U.S. Application Data

(60) Provisional application No. 63/106,997, filed on Oct. 29, 2020.

(51) Int. Cl.
    *H04N 21/238*      (2011.01)
    *H04N 21/2343*      (2011.01)
    *H04N 21/235*      (2011.01)
    *H04N 21/488*      (2011.01)
    *H04N 21/647*      (2011.01)
    *H04N 21/81*      (2011.01)

(52) U.S. Cl.
    CPC ... *H04N 21/23805* (2013.01); *H04N 21/2343* (2013.01); *H04N 21/2353* (2013.01); *H04N 21/4888* (2013.01); *H04N 21/6473* (2013.01); *H04N 21/812* (2013.01)

(58) Field of Classification Search
    CPC ......... H04N 21/23805; H04N 21/2343; H04N 21/2353; H04N 21/4888; H04N 21/6473; H04N 21/812
See application file for complete search history.

(56) References Cited

U.S. PATENT DOCUMENTS

| | | | |
|---|---|---|---|
| 7,617,294 B1 * | 11/2009 | Harding | G06F 16/9577 709/217 |
| 9,118,951 B2 | 8/2015 | Gandhi et al. | |
| 9,191,422 B2 | 11/2015 | Tarbox et al. | |
| 10,277,933 B2 | 4/2019 | Venkitaraman et al. | |
| 2012/0131601 A1 * | 5/2012 | McDysan | H04N 21/25808 725/28 |
| 2014/0280571 A1 | 9/2014 | Tarbox et al. | |

(Continued)

OTHER PUBLICATIONS

International Search Report and Written Opinion for Application No. PCT/US2021/055151 dated Jan. 25, 2022 (9 pages).

*Primary Examiner* — Jefferey F Harold
*Assistant Examiner* — Franklin S Andramuno
(74) *Attorney, Agent, or Firm* — Panitch Schwarze Belisario & Nadel LLP

(57) ABSTRACT

A system and method for selectively utilizing an over-the-air broadcast source to provide low-latency content as an alternative to conventional over-the-top sourced content. The disclosed technology can provide automatic switching to an available low-latency content source, or switch to a low-latency source only after a user affirmatively elects such. The system and method are implemented utilizing standard premises equipment, and enable the insertion of regional commercial messages into the low-latency content stream prior to viewing.

20 Claims, 4 Drawing Sheets

(56) References Cited

U.S. PATENT DOCUMENTS

| | | |
|---|---|---|
| 2017/0188054 A1 | 6/2017 | Ma et al. |
| 2018/0270534 A1* | 9/2018 | Badawiyeh ...... H04N 21/23424 |
| 2020/0204849 A1 | 6/2020 | Loheide et al. |
| 2020/0296468 A1* | 9/2020 | Wittke ............... H04N 21/4751 |
| 2021/0120315 A1* | 4/2021 | Makinen .............. H04N 21/236 |
| 2021/0185381 A1* | 6/2021 | Clift ................. H04N 21/44209 |
| 2021/0219029 A1* | 7/2021 | Fuhrer ............. H04N 21/44204 |
| 2022/0035724 A1* | 2/2022 | Strein ................. H04N 21/854 |

* cited by examiner

SYSTEM AND METHOD FOR THE UTILIZATION OF A LOW-LATENCY VIDEO SOURCE

CROSS-REFERENCE TO RELATED APPLICATION

This application claims the benefit of U.S. Provisional Patent Application No. 63/106,997, filed Oct. 29, 2020, which is incorporated by reference herein in its entirety.

BACKGROUND OF THE INVENTION

The ever-increasing provision of broadband media services to residential customers has greatly expanded consumer access to a host of entertainment and information sources. Typically, access to broadband media is managed through an on-premises media gateway appliance ("MGA"), such as broadband modem or router. An MGA is then usually linked, via a local network, to one or more client devices, such as set-top boxes, computers, tablets or smartphones upon which media can be viewed/consumed. An MGA is most often connected to a headend managed by a multi-service operator ("MSO"). A consumer can utilize the MGA, in conjunction with a client device, to access broadband media services originating from the headend (on-demand programming, live network programming, etc.).

In addition to the broadband media offerings available from the MSO headend, consumers are increasingly using MGAs to access broadband content from non-MSO providers. This non-MSO content would include video content from streaming services such as Netflix, Amazon, Hulu and Disney+. Content from these providers is often referred to as Over-The-Top ("OTT") content, because it provided to the consumer's MGA/client device from servers managed by entities other than the MSO. For example, to access Netflix content a consumer would establish an account with Netflix and utilize the MGA/client device arrangement to directly connect with a Netflix-managed server for provision of the content. The content is accessed independently of the MSO, or "over the top" of the MSO provided environment.

Although various types of OTT content, such as news and sporting events, are often referred to as "live", the content viewed by a given consumer via a client device is typically delayed by as much as one or two minutes, when compared to a standard over-the air Advanced Television Systems Committee ("ATSC") broadcast of the same event. This delay is introduced by the processing that occurs in the transmission chain between an OTT provider and a client device that is consuming the content. For most casual viewing, such as entertainment programming, this delay is inconsequential to the consumer. However, in certain circumstances and with particular content, such a delay can have serious repercussions. For example, if the OTT content being consumed is related to financial information, one or two minutes of delay in a stock trade can have serious detrimental consequences with respect to an investment portfolio. Another arena in which a delay of one or more minutes could easily introduce unacceptable negative financial repercussions would be legal sports betting. The typical OTT delay would also be unacceptable, if not dangerous, when the content was related to weather and environmental warnings (tornado, thunderstorm, tsunami, etc.). The introduction of a significant delay may even be unacceptable with respect to some entertainment content. With the advent of social media, posting or "tweeting" about a particular plot twist or character dialogue in real-time is a common practice. If an OTT consumer was two minutes delayed in seeing the particular twist or dialogue, they would be unable to properly participate in or add to the social media experience.

It would therefore be advantageous if an MGA/client device could provide a consumer with ready access to ATSC broadcast content when an OTT delay was deemed unacceptable. Such access should be made available to a consumer in a seamless fashion, via the same interface and display device(s) utilized for viewing OTT content.

BRIEF SUMMARY OF THE INVENTION

A system and method for selectively utilizing an over-the-air broadcast source to provide low-latency content as an alternative to conventional over-the-top sourced content. The disclosed technology can provide automatic switching to an available low-latency content source, or switch to a low-latency source only after a user affirmatively elects such. The system and method are implemented utilizing standard premises equipment, and enables the insertion of regional commercial messages into the low-latency content stream prior to viewing.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
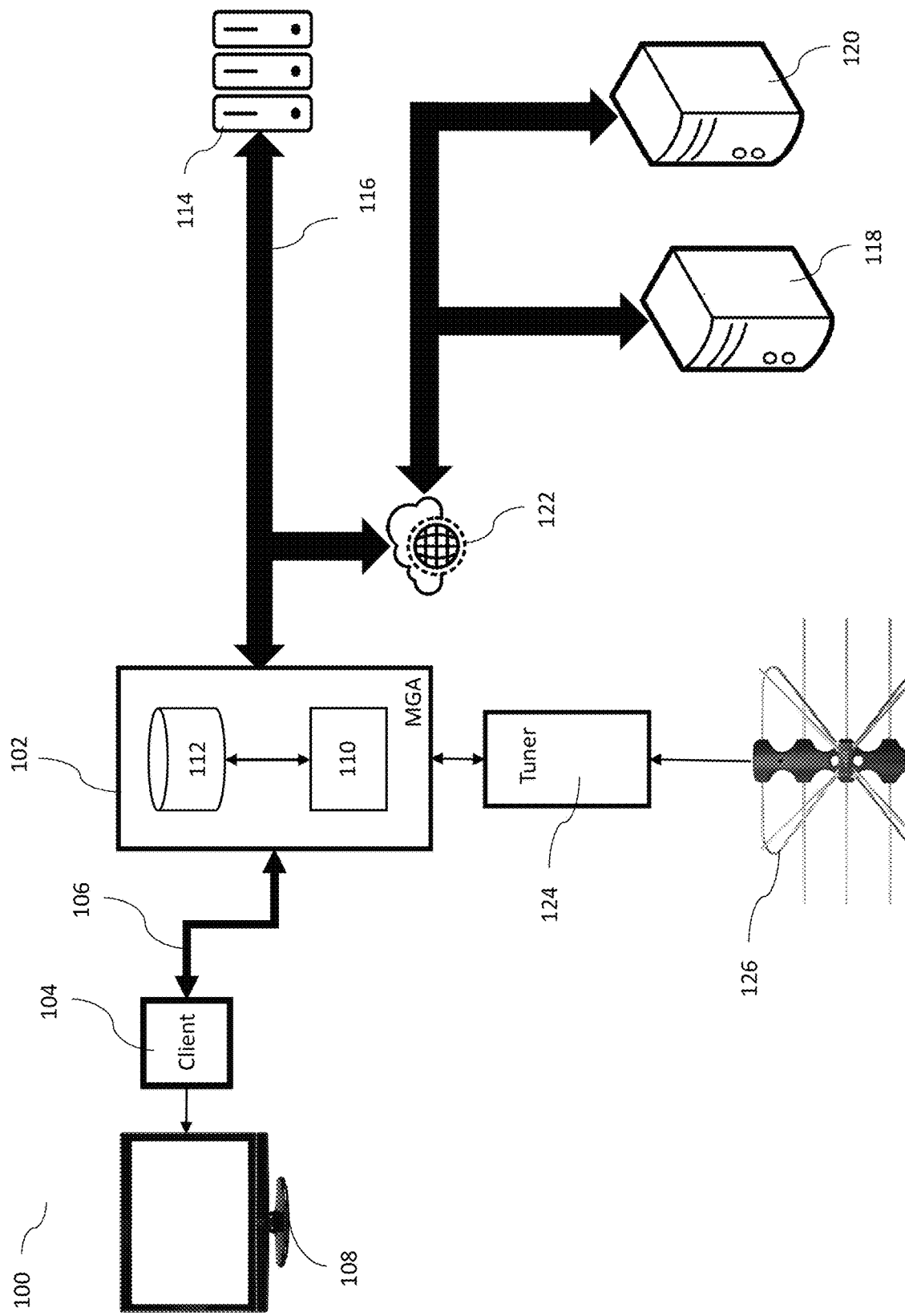
FIG. 1 is a functional block diagram of a first preferred embodiment of a system adapted for the provision of a low-latency video source.

FIG. 1 is a functional diagram of a first preferred embodiment of a system (100) adapted to provide ATSC broadcast content via an MGA that is otherwise adapted to deliver OTT content. As shown, the system comprises MGA 102 connected to client device 104 via local network 106. Client device 104 id also connected to video monitor 108. MGA 102 includes processor 110 and memory 112. MGA 102 is also shown to be linked to broadband MSO headend 114 via broadband network 116. Broadband network 116 is also shown to provide a link between MGA 102 and OTT provider servers 118, and 120, via the internet (122). In addition, MGA 102 is also linked to an ATSC tuner 124, which receives over-the-air ATSC broadcasts via antenna 126. Processor 110 within MGA 102 is adapted to control the provision of content to client device 104 and video monitor 108. This provision is done in response to user commands received from client device 104 and in accordance with instructions and information stored in memory 112. This content includes OTT content received from one or more of the OTT servers (120 and 122), as well as ATSC content from tuner 124. One example of a client device would be a set-top box; other types of client devices include smart televisions, computer systems, tablets, smartphones, etc. Note that while ATSC broadcasting is used within this disclosure, embodiments can use other terrestrial and/or satellite broadcasting schemes, and are not limited to ATSC.

Figure 2:
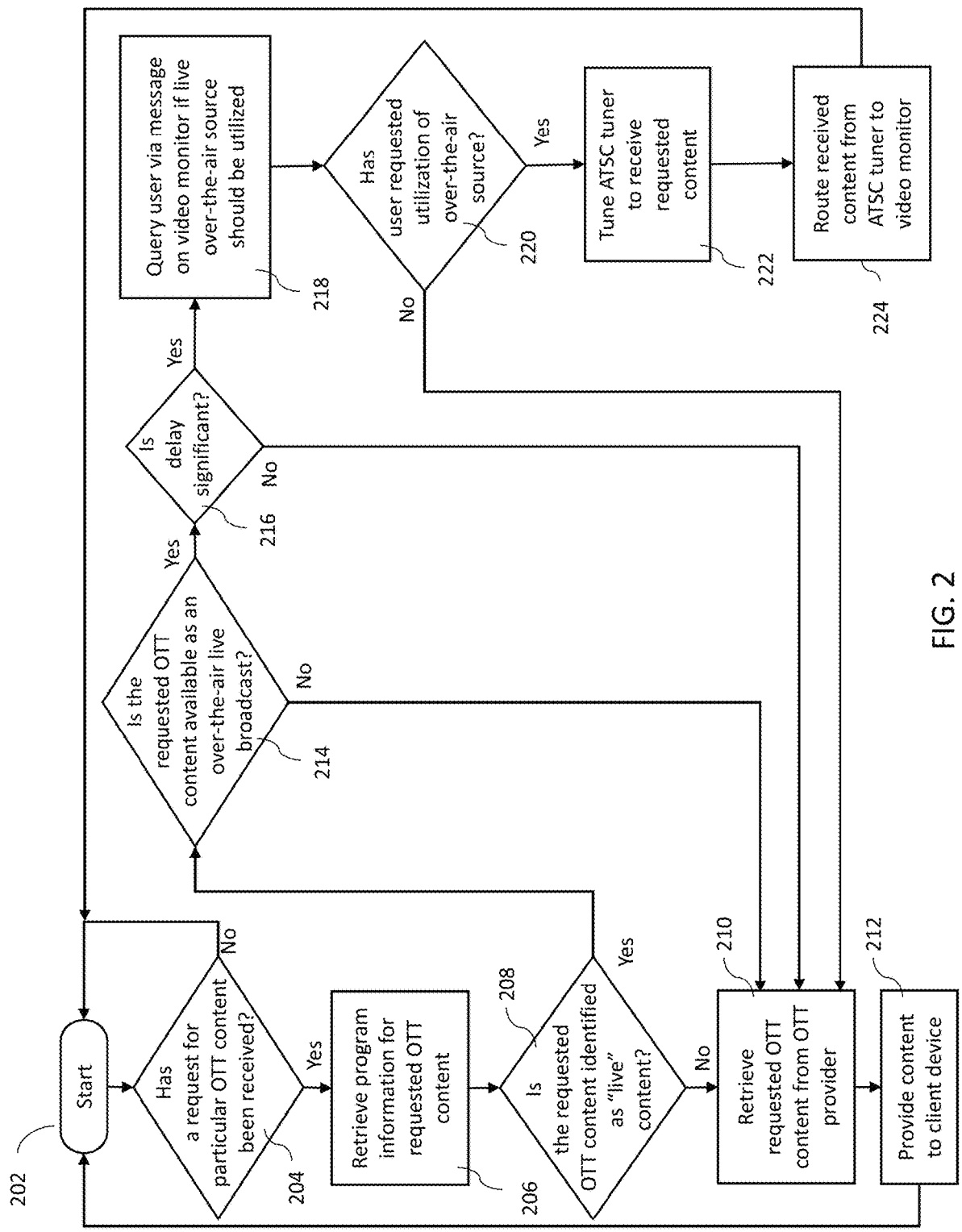
FIG. 2 is a flow diagram of a first process supported by the system of FIG. 1.

Processor 110 is adapted to retrieve program metadata related to OTT content requested by a user (see steps 202, 204 and 206 of FIG. 2). This metadata is typically transmitted by an OTT provider as digitally-encoded information along with the associated content, or as separately transmitted program menu/guide information. The information contained in the metadata can include one or more of content title, content genre (movie, news, financial, entertainment, etc.), source descriptor (live, recorded), content duration, content format (standard definition, high definition). The received metadata is stored in memory 112 by processor 110. Utilizing the instructions and/or information within memory 112, processor 110 responds to a user's request for specific content by first determining if the metadata identifies the requested OTT content as a "live" program (step 208). If this query results in a negative outcome, the process continues with steps 210 and 212, wherein the content is retrieved from the OTT provider and provided to the client device for display.

However, if step 208 results in an affirmative outcome, processor 110 determines if the requested OTT content is available via ATSC tuner 124 as a live over-the-air broadcast. This determination would be made utilizing metadata received via ATSC tuner and/or MSO headend 114. If the query returned a negative result, the process would continue with step 210. If, at 214, the requested OTT program was indeed available as a live ATSC broadcast, processor 110 would then determine if the delay between the OTT content and the available over-the-air content was significant (step 216). This could be computed in relation to a predetermined maximum desirable delay value stored in memory 112. This value could be dependent upon the content type. For example, a delay of one minute might be considered acceptable for a sporting event, but not for a news program. If the delay was found to be insignificant, the process would continue with step 210. In some embodiments, a delay may be deemed significant when it exceeds ten seconds. In some embodiments, the delay may be determined by comparing audio and/or video information between the OTT source and the ATSC broadcast. In some embodiments, dialog within the audio track from the OTT source and the ATSC broadcast may be identified via a speech-to-text process, and timestamped. A phrase or other combination of words may be identified in each source, and the timestamps compared to determine a delay.

Figure 3:
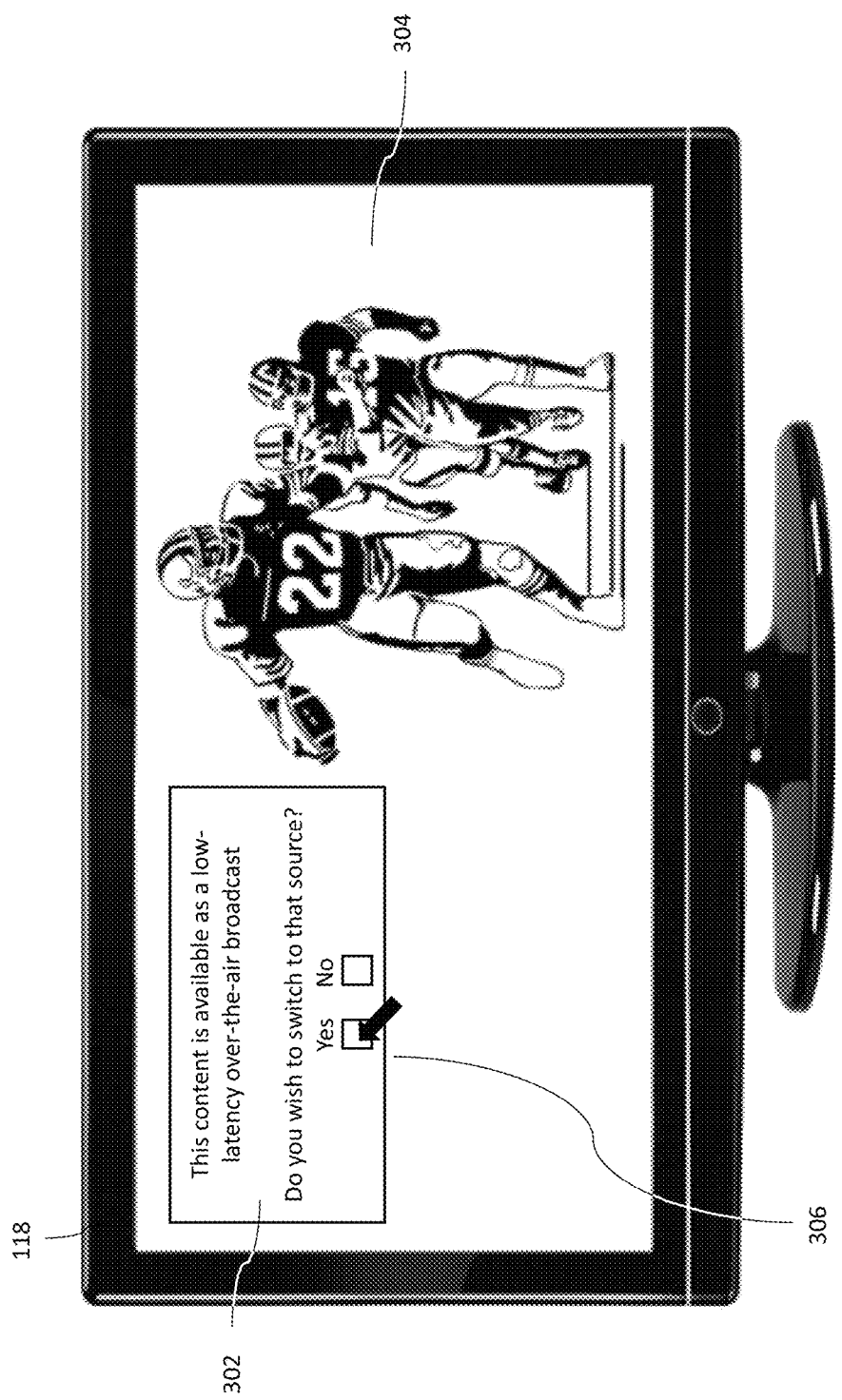
FIG. 3 is a representation of a first display produced by the system of FIG. 1 and providing a user with notice of available low-latency content.

An affirmative outcome from step 216 would result in processor 110 generating a message informing the user of the availability of a low-latency ATSC source for the requested content, and display that message upon video monitor 108 and along with a query as to whether the over-the-air source should be utilized (step 218). FIG. 3 provides a depiction of such a message (302) superimposed over OTT content (304) displayed upon video monitor 108. The user would then provide an indication as to whether he or she desires the over-the-air source to be utilized (step 218). As shown in FIG. 3, a user could manipulate on-screen cursor 306 so as to select "YES" or "NO". If a user responded in the negative, the process would continue with step 210. An affirmative response by a user would result in processor 110 instructing ATSC tuner 124 to tune to the proper channel or frequency to receive the requested content (step 222). This received content would then be routed by processor 110 to client device 104 for display upon video monitor 108 (step 224).

Processor 110 is further adapted to monitor the low-latency from ATSC tuner 124 as it is streamed to client device 104. If the low-latency stream is lost or degrades to some predetermined unacceptable level of quality, processor 110 will reacquire the OTT content stream that had previously been streaming, and route it to client device 104 in place of the lost or degraded low-latency stream. Thus, embodiments can include detecting the loss of a viable content signal from the at least one low-latency content source; and replacing the stream originating from the at least one low-latency content source to the at least one client device with the over-the-top content stream based, at least in part, upon the detection. A viable content signal is a content signal of sufficient quality to deliver content with an acceptable quality of service. In some embodiments, the viability may be inferred based on an error rate of a tuner, an error rate of an audio decoder, an error rate of a video decoder, and/or other suitable techniques. In some embodiments, a user may be prompted if he/she wishes to revert to an OTT content source in cases where the error rate (of tuner, audio, and/or video decoder) exceeds a predetermined level.

Figure 4:
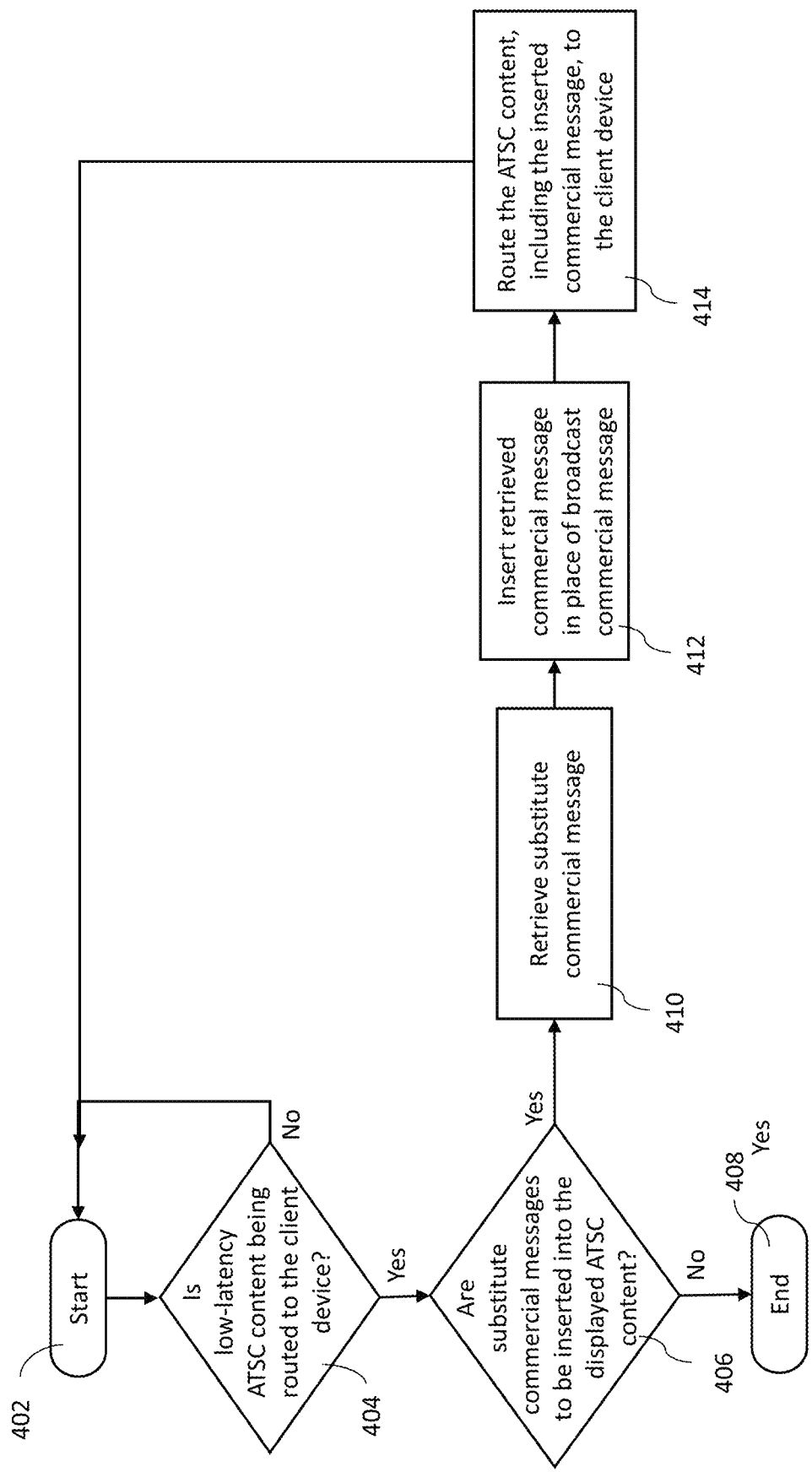
FIG. 4 is a flow diagram of a second process supported by the system of FIG. 1.

The flow diagram of FIG. 4 depicts a process that would be performed by an alternate embodiment of the disclosed technology supported by the system of FIG. 1. The depicted process, performed by processor 110, determines if a user has opted to route low-latency ATSC tuner content to client device 104 in lieu of OTT content (steps 402 and 404). If so, the process continues with step 406. In this step, processor 110 queries memory 112 as to information indicating that substitute commercial messages are to be inserted into the low-latency ATSC content in place of all or some of the originally-broadcast commercial messages. This substitution being performed by processor 110 prior to display of the ASTC content upon video monitor 108. Detection of commercial messages within ATSC broadcasts is well-known in the art, as it's the technology for inserting substitute commercial messages in place of the originally-broadcast ones (such substitutions are commonly made to insert regional advertisements over and in place of national advertisements in streaming content). These processes will not be discussed further here.

If no such substitutions are to be made, the process terminates with step 408. However, if processor 110 determines that a substitute commercial message is to be inserted, at 410, the content for such messages is retrieved from memory 112 by processor 110. This content could have been previously downloaded from an OTT provider (118, 120) or from an MSO headend (114). Processor 110 then inserts the retrieved commercial messages into the content intervals previously occupied by the original commercial messages (step 412). The ATSC content, with the substitute commercial messages, is then routed to client device 104 for display upon video monitor 108 (step 414).

Although the invention herein has been described with reference to particular embodiments, it is to be understood that these embodiments are merely illustrative of the principles and applications of the present invention. For example, any of the links or connections described or shown as wired connections could be accomplished via wireless means (Wi-Fi, cellular, etc.). The system and method could also be modified to so as to automatically switch from OTT sourced content to a low-latency source when such was available. The user would be provided with low latency content without any screen prompts, or the need to provide user input or affirmation. This unilateral content switching could be implemented for all OTT content, or conditionally as function of the user, content type, magnitude of delay, or other variables. It will also be understood that all or part of the above-described processing and storage associated with MGA 102 could be performed in whole or in-part by an offsite server, or processing means located either an MSO headend or otherwise remotely located with respect to the one or more client devices. All of the above variations and reasonable extensions therefrom could be implemented and practiced without departing from the spirit and scope of the present invention as defined by the appended claims.

The invention claimed is:

1. A system for providing low-latency video content in an over-the-top content environment, comprising:
   at least one media gateway appliance comprising at least one memory and at least one processor;
   at least one client device linked to the at least one media gateway appliance;
   at least one over-the-top video content source, linked to the at least one media gateway appliance; and
   at least one low-latency video content source, linked to the at least one media gateway appliance;
   wherein the at least one memory is adapted to store over-the-top video content metadata, low-latency video content availability information, and a predetermined maximum desirable delay value; and
   wherein the at least one processor is configured to:
      determine, based on at least the over-the-top video content, metadata whether the over-the-top video content is a live program;
      in response to determining that the over-the-top video content is a live program, determine, based, at least in part, on the stored over-the-top video content information and the low-latency video content availability information, that video content presently being streamed to the at least one client device via the at least one gateway media appliance from the at least one over-top video content source is also available from the at least one low-latency video content source;
      determine whether a delay between the over-the-top video content and a video content stream originating from the at least one low-latency video content source exceeds the predetermined maximum desirable delay value stored in memory, and
      replace, in response to the delay exceeding the predetermined maximum desirable delay value, the over-the-top video content stream to the at least one client device with the video content stream originating from the at least one low-latency video content source.

2. The system of claim 1 wherein the replacement is performed without user intervention.

3. The system of claim 1 wherein the at least one processor is further adapted to:
   detect the loss of a viable video content signal from the at least one low-latency video content source; and
   replace the stream originating from the at least one low-latency video content source to the at least one client device with the over-the-top video content stream based, at least in part, upon the detection.

4. The system of claim 1 wherein the over-the-top video content metadata comprises at least one of the following:
   content title;
   content genre;
   source descriptor;
   content duration; and
   content format.

5. The system of claim 1, wherein:
   the at least one memory is further adapted to store at least one particular commercial message; and
   wherein the at least one processor is further adapted to:
      detect commercial messages within the video content stream originating from the at least one low-latency video content source;
      retrieve the at least one particular commercial message from the at least one memory; and
      replace at least one detected commercial message within the content stream originating from the low-latency video content source, with the retrieved at least one commercial message.

6. The system of claim 1 wherein he at least one processor is further adapted to:
   measure the quality of the content stream originating from the at least one low-latency video content source; and
   replace the low-latency video content stream to the at least one client device with the over-the-top video content that was previously streaming to the at least one client device.

7. The system of claim 1 wherein the at least one processor is further adapted to:
   generate a message to inform a user of the determination that video content presently being streamed to the at least one client device via the at least one gateway media appliance from the at least one over-top video content source is also available from the at least one low-latency video content source; and
   display the generated message via the at least one client device.

8. The system of claim 7 wherein:
   the at least one processor is further adapted to calculate the latency between the video content presently being streamed to the at least one client device and the video content available from the at least one low-latency video content source, and
   wherein the generation and display of the message is based, at least in part, upon the calculated latency.

9. The system of claim 7 wherein at least one processor is adapted to:
   receive user responses communicated via the at least one client device; and
   replace the over-the-top video content stream to the at least one client device with a video content stream originating from the at least one low-latency video content source only after a particular user response is received.

10. The system of claim 7 wherein the generated and displayed message comprises a text message presented as an overlay upon the video content presently being streamed to the at least one client device.

11. A method for providing low-latency video content, in a system comprising:
   at least one client device linked to the at least one media gateway appliance;
   at least one over-the-top video content source, linked to the at least one media gateway appliance;
   at least one low-latency video content source, linked to the at least one media gateway appliance; and
   at least one memory adapted to store over-the-top video content metadata, low-latency video content availability information, and a predetermined maximum desirable delay value;
   wherein the method comprises the steps of:
      determine, based on at least the over-the-top video content metadata, whether the over-the-top video content is a live program;

in response to determining that the over-the-top video content is a live program, determining, based, at least in part, on the stored over-the-top video content information and the low-latency video content availability information, that video content presently being streamed to the at least one client device via the at least one gateway media appliance from the at least one over-top video content source is also available from the at least one low-latency video content source;

determining whether a delay between the over-the-top video content and a video content stream originating from the at least one low-latency video content source exceeds the predetermined maximum desirable delay value stored in the at least one memory, and replacing, in response to the delay exceeding the predetermined maximum desirable delay value, the over-the-top video content stream to the at least one client device with a video content stream originating from the at least one low-latency video content source based, at least in part, upon the determination.

12. The method of claim 11 wherein the step of replacing is performed without user intervention.

13. The method of claim 11 further comprising the steps of:
    detecting the loss of a viable video content signal from the at least one low-latency video content source; and
    replacing the stream originating from the at least one low-latency video content source to the at least one client device with the over-the-top video content stream based, at least in part, upon the detection.

14. The method of claim 11 further comprising the steps of:
    detecting the loss of a viable video content signal from the at least one low-latency video content source; and
    replacing the stream originating from the at least one low-latency video content source to the at least one client device with the over-the-top video content stream based, at least in part, upon the detection.

15. The method of claim 11 wherein the over-the-top video content metadata comprises at least one of the following:
    content title;
    content genre;
    source descriptor;
    content duration; and
    content format.

16. The method of claim 11, wherein:
    the at least one memory is further adapted to store at least one particular commercial message; and
    wherein the method further comprises the steps of:
        detecting commercial messages within the video content stream originating from the at least one low-latency video content source;
        retrieving the at least one particular commercial message from the at least one memory; and
        replacing at least one detected commercial message within the video content stream originating from the low-latency video content source, with the retrieved at least one commercial message.

17. The method of claim 11 further comprising the steps of:
    generating a message to inform a user of the determination that video content presently being streamed to the at least one client device via the at least one gateway media appliance from the at least one over-top video content source is also available from the at least one low-latency video content source; and
    displaying the generated message on the at least one client device.

18. The method of claim 17 further comprising the steps of:
    calculating the latency between the video content presently being streamed to the at least one client device and the video content available from the at least one low-latency video content source, and
    generating and displaying the message based, at least in part, upon the calculated latency.

19. The method of claim 17 further comprising the steps of:
    receiving user responses communicated via the at least one client device; and
    replacing the over-the-top video content stream to the at least one client device with a video content stream originating from the at least one low-latency video content source only after a particular user response is received.

20. The method of claim 17 wherein the generated and displayed message comprises a text message presented as an overlay upon the video content presently being streamed to the at least one client device.

* * * * *